United States Patent [19]

Dickens et al.

[11] Patent Number: 5,101,010

[45] Date of Patent: Mar. 31, 1992

[54] AIR-DRYABLE RESINS AND PROCESSES FOR PREPARING SAME

[75] Inventors: Brian Dickens; Barry J. Bauer, both of Gaithersburg, Md.

[73] Assignee: United States Government of America, Washington, D.C.

[21] Appl. No.: 558,426

[22] Filed: Jul. 27, 1990

[51] Int. Cl.$^5$ .............................................. C08G 63/20
[52] U.S. Cl. ................................ 528/272; 528/295.5; 528/300; 528/302; 106/20; 106/23; 106/27; 106/28
[58] Field of Search ............ 528/272, 299.9, 300, 528/302; 106/20, 23, 27, 28

[56] References Cited

U.S. PATENT DOCUMENTS

| | | | |
|---|---|---|---|
| 2,631,986 | 3/1953 | Schmutzler | 524/386 |
| 3,126,356 | 3/1964 | Kraft | 260/404.8 |
| 3,666,698 | 5/1972 | Harris et al. | 530/232 |
| 4,104,144 | 8/1978 | Weiss et al. | 204/159.23 |
| 4,201,842 | 5/1980 | Lombardi et al. | 430/281 |
| 4,206,099 | 6/1980 | Bentley et al. | 528/295.5 |
| 4,214,965 | 7/1980 | Rowe | 204/159.15 |
| 4,277,319 | 7/1981 | Nyi et al. | 204/159.23 |
| 4,334,970 | 6/1982 | Lombardi et al. | 204/159.15 |
| 4,335,027 | 6/1982 | Cremeans et al. | 528/281 |
| 4,368,316 | 1/1983 | Laddha et al. | 528/295.5 |
| 4,391,648 | 7/1983 | Ferrill, Jr. | 106/308 |
| 4,587,200 | 5/1986 | Tamoto et al. | 430/281 |
| 4,694,033 | 9/1987 | van der Linde | 523/437 |
| 4,997,480 | 3/1991 | Rao | 106/251 |

Primary Examiner—John Kight, III
Assistant Examiner—Sam A. Acquah
Attorney, Agent, or Firm—Staas & Halsey

[57] ABSTRACT

An air-dryable resin includes a reaction product of an intromolecular acid anhydride and an ester of an unsaturated fatty acid tripentaerythritol. Before curing, air-dryable resins of the present invention are dispersible in alkaline water. After curing, air-dryable resins of the present invention are resistant to chemical and physical attack.

22 Claims, No Drawings

AIR-DRYABLE RESINS AND PROCESSES FOR PREPARING SAME

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

1. Field of the Invention

The present invention relates generally to air-dryable resins and processes for preparing air-dryable resins. More particularly, the invention relates to air-dryable intaglio ink resins that are dispersible in alkaline water, and processes for preparing same.

2. Description of the Related Art

Air-dryable alkyd resins, e.g., based on trimethylol propane, isophthalic acid, linseed oil fatty acids, and trimellitic anhydride, have been used in intaglio inks. These resins require the use of volatile solvents in order to be diluted to a low enough viscosity to be washed off a printing press with a cleaning solution.

Recently, pollution regulations and environmental concern have created a need for air-dryable resins that require minimum amounts of volatile solvents in order to be diluted to a viscosity low enough to make the ink containing the resin wash off the printing press. Such air-dryable resins must be suitable for printing, e.g., exhibit acceptable rheological properties such as viscosity and flow. Also, the resulting air-dried films must be resistant to chemical and physical attack.

SUMMARY OF THE INVENTION

It is an object of the present invention to provide air-dryable resins which do not require the use of volatile solvents in order to be diluted enough to be washed off a printing press.

Another object of the present invention is to provide air-dryable resins that possess acceptable rheological properties such as viscosity and flow.

Still another object of the present invention is to provide air-dryable resins that cure in air to form air-dried films that are resistant to chemical and physical attack.

Yet another object of the present invention is to provide processes for preparing air-dryable resins that achieve the foregoing and other objects.

In order to achieve the foregoing and other objects, in accordance with the purposes of the present invention as described herein, an esterified reaction product of at least one unsaturated fatty acid and a polyhydric alcohol is further reacted with an intramolecular acid anhydride.

In a preferred composition of the present invention, the at least one unsaturated fatty acid is selected from the group including tall oil fatty acids, linolenic acid, linseed oil fatty acids and tung oil fatty acids, the polyhydric alcohol includes tripentaerythritol and the intramolecular acid anhydride includes at least one of trimellitic anhydride, succinic anhydride and phthalic anhydride.

In a preferred process of preparing the present invention, the at least one unsaturated fatty acid and the polyhydric alcohol are reacted with constant stirring at about 200°–245° C. until the acid number of the resulting esterified reaction product is less than about 10, at which time the esterified reaction product is cooled to about 120°–130° C. An acid anhydride is added to the esterified reaction product and this mixture is then heated to about 170°–180° C., at which it is held for about 10–30 minutes. This reaction product is then cooled to room temperature.

These and other features and advantages of the present invention will become more apparent with reference to the following detailed description.

DETAILED DESCRIPTION OF THE PREFERRED EMBODIMENTS

Air-dryable resins of the present invention are based on esters of unsaturated fatty acids which undergo oxidation (curing) in air to form cross-linked air-dried films. Oxidation may be aided by adding metal salts known as driers, e.g., cobalt salts of organic acids.

At least one unsaturated fatty acid is reacted with a polyhydric alcohol to form an esterified reaction product. The esterified reaction product is a drying oil type of molecule, and typically has more than three fatty acid groups esterified to each polyhydric alcohol molecule. Naturally occurring drying oils, on the other hand, usually have three or fewer fatty acid groups attached to each polyhydric alcohol molecule.

Some of the remaining hydroxyl groups on the esterified reaction product are further reacted with an intramolecular acid anhydride to give free pendant acids groups. In alkaline water, these free pendant acid groups provide salts which disperse the air-dryable resins, thereby making the resins water dispersible.

The polyhydric alcohol may be, for example, tripentaerythritol (HOCH$_2$)$_3$CCH$_2$OCH$_2$C(CH$_2$OH)$_2$CH$_2$OCH$_2$C (CH$_2$OH)$_3$. The use of tripentaerythritol in the preparation of air-dryable resins of the present invention provides resins having acceptably low viscosity and which air-dry to form well cross-linked films. If a higher viscosity resin is desired, a di-acid may also be included in the esterification step.

The at least one unsaturated fatty acid may include, for example, tall oil fatty acids, linseed oil fatty acids, tung oil fatty acids and/or linolenic acid CH$_3$(CH$_2$CH=CH)$_3$(CH$_2$)$_7$COOH. The intramolecular acid anhydride may include, for example, trimellitic anhydride (HOOC)C$_6$H$_3$(CO)$_2$O, succinic anhydride C$_2$H$_4$(CO)$_2$O and/or phthalic anhydride C$_6$H$_4$(CO)$_2$O.

Air-dryable resins of the present invention may be used, for example, in intaglio inks, which may also contain pigments, extenders, driers, waxes and other ingredients, including free fatty acid or other surfactants.

Air-dryable resins of the present invention may be prepared by esterifying about 250 to 525 parts by weight (about 53 to 84 weight percent based on the weight of the final reaction product) of at least one fatty acid selected from a group including tall oil fatty acids, linseed oil fatty acids, tung oil fatty acids and linolenic acid and about 80 to 140 parts by weight (about 13 to 29 weight percent based on the weight of the final reaction product) of tripentaerythritol at about 200°–245° C. A di-acid, e.g., isophthalic acid or sebacic acid may also be included in this esterification step if a higher viscosity resin is required. A high boiling point inert solvent, such as decane, may be used to help remove the water formed in the esterification step, but this step is not necessary. The esterification reaction is followed by measuring the acid number of the reaction product.

When the acid number is below about 10, the reaction product is cooled to about 120°–130° C. and about 0 to 125 parts by weight (about 0 to 26 weight percent based on the weight of the final reaction product) of intramolecular acid anhydride, e.g., trimellitic anhydride, phthalic anhydride, and/or succinic anhydride is added. This reaction mixture is then heated to about 170°–180° C., and after about 10 to 30 minutes of reaction, the reaction mixture is cooled.

In a preferred method of preparing the air-dryable resins of the present invention about 268 to 445 parts by weight (about 55 to 75 weight percent based on the weight of the final reaction product) of the at least one fatty acid, about 90 to 122 parts by weight (about 15 to 25 weight percent based on the weight of the final reaction product) of tripentaerythritol, and about 47 to 108 parts by weight (about 8 to 22 weight percent based on the weight of the final reaction product) of the intramolecular acid anhydride are reacted as discussed in the previous paragraph.

In yet a more preferred method of preparing the air-dryable resins of the present invention about 312 to 357 parts by weight (about 60 to 65 weight percent based on the weight of the final reaction product) of the at least one fatty acid, about 99–115 parts by weight (about 18 to 22 weight percent based on the weight of the final reaction product) of tripentaerythritol, and about 82 to 104 parts by weight (about 15 to 20 weight percent based on the weight of the final reaction product) of the acid anhydride are reacted as discussed above.

EXAMPLE 1

A first example of the present invention was made by esterifying 107 grams of linolenic acid and 28.8 grams of tripentaerythritol in a 500 mL three-necked flask equipped with a water condenser-cooled side arm having a Dean-Stark trap to monitor the amount of water produced from the esterification. The contents of the flask were heated to 245° C. with continuous stirring. The esterification reaction of the linolenic acid and the tripentaerythritol was followed by monitoring the amount of water produced and by titrating aliquots of the reaction product dissolved in isopropanol with potassium hydroxide dissolved in isopropanol. The theoretical amount of water produced by this reaction is 7.0 mL. When an acid number, i.e., number of milligrams of potassium hydroxide per gram of resin, of less than 10 was measured, the reaction mixture was cooled to 125° C. Then, 13.8 grams of trimellitic anhydride was added to the esterification reaction product and the reaction mixture was heated to 175° C. and further reacted at 175° C. for 30 minutes. The final reaction product was allowed to cool to room temperature and its acid number was determined to be 65.

| Component Description | Parts By Weight | Weight % |
| --- | --- | --- |
| Tripentaerythritol | 28.8 | 19.3% |
| Linolenic acid | 107.0 | 71.5% |
| Trimellitic anhydride | 13.8 | 9.2% |
|  | 149.6 | 100.0% |

EXAMPLE 2

A second example of the present invention was made by esterifying 91.6 grams of linseed oil fatty acids and 30.4 grams of tripentaerythritol in a 500 mL three-necked flask equipped with a water condenser-cooled side arm having a Dean-Stark trap to monitor the amount of water produced from the esterification. Also, 12.2 grams of decane was added to help remove the water formed by the esterification reaction. The contents of the flask were heated and reflux started at 203° C. and ended at 223° C. The esterification reaction was followed by monitoring the amount of water produced, which was 5.5 mL. By titrating aliquots of the esterification reaction product dissolved in isopropanol with potassium hydroxide dissolved in isopropanol, an acid number of 3 was measured. The decane was removed by distillation and the esterification reaction product was cooled to 122° C. Then, 27.0 grams of succinic anhydride was added to the esterification reaction product and this mixture was heated to 180° C. and further reacted at 180° C. for 30 minutes. The final reaction product was allowed to cool to 25° C. and its acid number was at 76. Since the use of decane is not required, decane is not included in the table of components shown below.

| Component Description | Parts By Weight | Weight % |
| --- | --- | --- |
| Tripentaerythritol | 30.4 | 20.4% |
| Linseed oil fatty acids | 91.6 | 61.5% |
| Succinic anhydride | 27.0 | 18.1% |
|  | 149.0 | 100.0% |

Several inks were made from air-dryable resins of the present invention and from conventional alkyds based on trimethylol propane, isophthalic acid, linseed oil fatty acids and trimellitic anhydride. Each of the inks also contained pigments, extenders, and driers such as cobalt salts of organic acids. The inks were drawn into films on glass plates and allowed to air-dry. The inks were also drawn into film layers on the type of paper used to print security documents. Several days later, all of the air-dried ink films were tested for resistance to chipping, scraping and to solvents, including acetone, toluene, aqueous bleach, and a 2% aqueous sodium hydroxide solution.

Air-dried ink films based on air-dryable resins of the present invention were better in all of the above-mentioned tests than films based on conventional alkyd formulation. More specifically, the above-mentioned solvents had no effect on or took significantly longer to show any effect on air-dried films based on air-dryable resins of the present invention. Also, air-dried films based on air-dryable resins of the present invention exhibited greater resistance to the 2% aqueous sodium hydroxide than did films based on conventional alkyd formulations. Before curing, however, films based on air-dryable resins according to the present invention are dispersible in caustic solutions, e.g., aqueous sodium hydroxide, and can be dispersed from a printing press without use of volatile solvents to lower viscosity.

Numerous modifications and adaptations of the present invention will be apparent to those so skilled in the art, e.g., the present invention may be used in paints and varnish Thus, it is intended by the following claims to cover all modifications and adaptations which fall within the true spirit and scope of the invention.

What is claimed is:

1. An air-dryable resin, comprising:

a reaction product of an intramolecular acid anhydride and an ester of an unsaturated fatty acid and tripentaerythritol.

2. An air-dryable resin as recited in claim 1, wherein:
said ester includes more than three molecules of said unsaturated fatty acid attached to each molecule of said tripentaerythritol.

3. An air-dryable resin as recited in claim 1, wherein:
said reaction product includes free pendant acid groups.

4. An air-dryable resin as recited in claim 1, wherein:
said reaction product is dispersible in alkaline water.

5. An air-dryable resin as recited in claim 5, wherein:
said unsaturated fatty acid is selected from a group consisting of tall oil fatty acids, linseed oil fatty acids, tung oil fatty acids and linolenic acid.

6. An air-dryable resin as recited in claim 5, wherein:
said intramolecular acid anhydride is selected from a group consisting of trimellitic anhydride, succinic anhydride and phthalic anhydride.

7. An air-dryable resin as recited in claim 1, wherein:
said tripentaerythritol is present in an amount of about 80 to about 140 parts by weight before esterification; and
said unsaturated fatty acid is present in an amount from about 250 to about 525 parts by weight before esterification.

8. An air-dryable resin as recited in claim 7, wherein:
said intramolecular acid anhydride is present in an amount of less than about 125 parts by weight before reaction.

9. An air-dryable resin as recited in claim 1, wherein:
said tripentaerythritol is present in an amount of about 13-29 weight percent before esterification, based on weight of said reaction product;
said unsaturated fatty acid is selected from a group consisting of linseed oil fatty acids, tung oil fatty acids, tall oil fatty acids and linolenic acid present in an amount of about 53-84 weight percent before esterification, based on weight of said reaction product; and
said intramolecular acid anhydride is selected from a group consisting of succinic anhydride, phthalic anhydride, and trimellitic anhydride present in an amount of about 0-26 weight percent before reaction, based on weight of said reaction product.

10. An air-dryable resin as recited in claim 1, wherein:
said tripentaerythritol is present in an amount of about 15-25 weight percent before esterification, based on weight of said reaction product;
said unsaturated fatty acid is selected from a group consisting of linseed oil fatty acids, tung oil fatty acids, tall oil fatty acids and linolenic acid present in an amount of about 55-75 weight percent before esterification, based on weight of said reaction product; and
said intramolecular acid anhydride is selected from a group consisting of succinic anhydride, phthalic anhydride, and trimellitic anhydride present in an amount of about 8-22 weight percent before reaction, based on weight of said reaction product.

11. An air-dryable resin as recited in claim 1, wherein:
said tripentaerythritol is present in an amount of about 18-22 weight percent before esterification, based on weight of said reaction product;
said unsaturated fatty acid is selected from a group consisting of linseed oil fatty acids, tung oil fatty acids, tall oil fatty acids and linolenic acid present in an amount of about 60-65 weight percent before esterification, based on weight of said reaction product; and
said intramolecular acid anhydride is selected from a group consisting of succinic anhydride, phthalic anhydride, and trimellitic anhydride present in an amount of about 15-20 weight percent before reaction, based on weight of said reaction product.

12. An air-dryable resin as recited in claim 1, wherein:
said reaction product has an acid number of about 50-80.

13. An ink based on an air-dryable resin, comprising:
a reaction product of an intramolecular acid anhydride and an ester of an unsaturated fatty acid and tripentaerythritol; and
at least one drier.

14. An ink based on an air-dryable resin as recited in claim 13, wherein:
said at least one drier includes cobalt salts of organic acids.

15. A process of preparing an air-dryable resin, comprising the steps of:
(a) heating at about 200°-245° C. an unsaturated fatty acid and tripentaerythritol until a reaction product having an acid number less than about 10 is obtained;
(b) cooling said reaction product to about 120°-130° C. and adding an intramolecular acid anhydride to said reaction product; and
(c) heating to about 170°-180° C.

16. A process of preparing an air-dryable resin as recited in claim 15, wherein step (a) further includes the substep of:
stirring.

17. A process of preparing an air-dryable resin as recited in claim 15, wherein step (a) further includes the substep of:
adding a di-acid.

18. A process of preparing an air-dryable resin, comprising the steps of:
(a) heating at about 200°-245° C. tripentaerythritol and an unsaturated fatty acid selected from a group consisting of tall oil fatty acids, linseed oil fatty acids, tung oil fatty acids and linolenic acid until a reaction product having an acid number less than about 10 is obtained;
(b) cooling said reaction product to about 120°-130° C. and adding an intramolecular acid anhydride selected from a group consisting of trimellitic anhydride, succinic anhydride and phthalic anhydride to said reaction product and
(c) heating to about 170°-180° C.

19. A process of preparing an air-dryable resin, comprising the steps of:
(a) heating at about 200°-245° C. about 80-140 parts by weight of tripentaerythritol and about 250-525 parts by eight of an unsaturated fatty acid until a reaction product having an acid number less than about 10 is obtained;
(b) cooling said reaction product to about 120°-130° C. and adding less than about 125 parts by weight of an intramolecular acid anhydride to said reaction product; and
(c) heating to about 170°-180° C.

20. A process of preparing an air-dried ink-film, comprising the steps of:
a) preparing an air-dryable resin dispersible in alkaline water by heating at about 200°–245° C. an unsaturated fatty acid and tripentaerythritol until a reaction product having an acid number less than about 10 is obtained, cooling said reaction product to about 120°–130° C. and adding an intramolecular acid anhydride to said reaction product, and heating to about 170°–180° C.;

(b) forming an air-dryable ink with said resin of step (a);

(c) forming an air-dryable ink-film by applying said ink of step (b) to a print medium; and (d) curing said ink-film of step (c) in air.

21. A process of preparing an air-dried ink-film as recited in claim 20, wherein:

said cured ink-film of step (d) is resistant to alkaline water.

22. A process of preparing an air-dried ink-film as recited in claim 20, wherein step (b) includes the sub-step of:

adding at least one of a pigment, an extender, a drier, a wax, a surfactant to said resin of step (a).

* * * * *